United States Patent
Ohno

[11] Patent Number: 5,128,806
[45] Date of Patent: Jul. 7, 1992

[54] APPARATUS FOR DRIVING OPTICAL SYSTEM

[75] Inventor: Takehide Ohno, Yokohama, Japan

[73] Assignee: Ricoh Company, Ltd., Tokyo, Japan

[21] Appl. No.: 598,209

[22] Filed: Oct. 16, 1990

[30] Foreign Application Priority Data

Oct. 17, 1989 [JP] Japan ............................. 1-269523
Dec. 26, 1989 [JP] Japan ............................. 1-337312

[51] Int. Cl.⁵ ............................................. G02B 7/02
[52] U.S. Cl. .................................. 359/813; 359/824; 369/44.15
[58] Field of Search ............... 359/823, 824, 813, 819; 369/44.15, 44.16, 44.17, 44.32, 44.33

[56] References Cited

U.S. PATENT DOCUMENTS

| 4,507,764 | 3/1985 | Musha | 359/824 |
| 4,566,089 | 1/1986 | Kime | 359/824 |
| 4,687,296 | 8/1987 | Terayama et al. | 359/824 |

FOREIGN PATENT DOCUMENTS 148159 8/1984 Japan .
285261 12/1987 Japan .

Primary Examiner—Loha Ben
Attorney, Agent, or Firm—Cooper & Dunham

[57] ABSTRACT

An apparatus for driving an optical system has an objective lens for converging a light beam for recording or reproducing information to a recording medium composed of a vertically magnetized thin film having magnetooptic characteristics, and a driving device for electromagnetically moving the objective lens in the direction of an optical axis thereof or in a direction perpendicular to the optical axis. The driving device has at least two magnetic circuits composed of yokes and permanent magnets and has coils passing through magnetic clearances of the magnetic circuits. The magnetic circuits are approximately arranged symmetrically with respect to the optical axis of the objective lens. Magnetizing directions of the permanent magnets constituting the magnetic circuits are asymmetrically set with respect to the optical axis of the objective lens.

9 Claims, 8 Drawing Sheets (a)

APPARATUS FOR DRIVING OPTICAL SYSTEM

BACKGROUND OF THE INVENTION

1. Field of the Invention

The present invention relates to an apparatus for driving an optical system used in an optical pickup in a magnetooptic disk drive unit.

2. Description of the Related Art

An apparatus for driving an optical system has an objective lens for converging a light beam for recording or reproducing information to a recording medium composed of a vertically magnetized thin film having magnetooptic characteristics. The optical system driving apparatus further has driving means for electromagnetically moving the objective lens in the direction of an optical axis thereof or in a direction perpendicular to this optical axis. Further, there is another apparatus for driving an optical system having an objective lens for converging a light beam for recording or reproducing information to a concentric or spiral track disposed in a recording medium in the shape of a disk composed of a vertically magnetized thin film having magnetooptic characteristics. This optical system driving apparatus further has a plurality of stationary magnetic circuits in addition to the above optical system including the objective lens. Each of the magnetic circuits is composed of a permanent magnet extending in parallel with a radial direction of the above recording medium in the shape of a disk, a yoke and a clearance. The optical system driving apparatus further has a coil fixed to the above optical system and at least one portion of this coil crosses a magnetic flux within the above clearance.

In such an optical system driving apparatus, a recording magnetic field or an erasing magnetic field is reduced by a leakage magnetic flux from the magnetic circuits disposed as a means for driving the optical system when information is recorded or reproduced. Accordingly, there is a fear that no information is sufficiently recorded or erased. Further, there is a fear that the leakage magnetic flux is applied to the recording medium at the reproducing time of information so that recorded information is damaged. For example, Japanese Patent Application Laying Open (KOKAI) Nos. 59-148159 and 62-285261 show techniques for solving the above problems.

In the former technique, a magnetic shielding member having a high permeability is arranged between the recording medium and a body of an optical pickup device.

In the latter technique, a correcting magnet is disposed around a lens actuator as a means for reducing the leakage magnetic flux in the vicinity of a convergent point of the light beam.

In the above former technique, the magnetic shielding member is arranged in a small space between the recording medium and the optical pickup. Therefore, there is a fear that the recording medium and the magnetic shielding member come in contact with each other. Accordingly, high accuracy in assembly is required to solve this problem.

There is another case in which the magnetic shielding member is fixed to the optical system movably disposed in a radial direction of the recording medium such that an arbitrary track of the recording medium can be accessed. In such a case, the weight of movable members is increased and this increase in weight prevents the track from being accessed at a high speed.

In the above latter technique, similar to the former technique, the weight of movable members is increased and this increase in weight prevents the track from being accessed at a high speed since the correcting magnet is disposed around the lens actuator of the optical pickup.

As mentioned above, the magnetic shielding member, the correcting magnet, etc. are newly disposed to reduce an influence of the leakage magnetic flux from the magnetic circuits as a mechanism for driving the optical system when information is recorded and reproduced. However, in such a case, the cost of the optical system driving apparatus is increased because high accuracy in assembly is required and the number of parts is increased. Further, the speed of an access operation is reduced by the increase in weight of movable portions in the optical system.

SUMMARY OF THE INVENTION

It is therefore an object of the present invention to provide an apparatus for driving an optical system in which no recording, erasing and reproducing operations of information are adversely affected by a leakage magnetic flux without adding a new magnetic shielding member causing an increase in weight of the optical system driving apparatus.

The above object of the present invention can be achieved by an apparatus for driving an optical system, comprising an objective lens for converging a light beam for recording or reproducing information to a recording medium composed of a vertically magnetized thin film having magnetooptic characteristics; and driving means for electromagnetically moving the objective lens in the direction of an optical axis thereof or in a direction perpendicular to the optical axis; the driving means having at least two magnetic circuits composed of yokes and permanent magnets and coils passing through magnetic clearances of the magnetic circuits, the number of magnetic circuits being an even number; the magnetic circuits being approximately arranged symmetrically with respect to the optical axis of the objective lens; and magnetizing directions of the permanent magnets constituting the magnetic circuits being asymmetrically set with respect to the optical axis of the objective lens.

The above object of the present invention can be also achieved by an apparatus for driving an optical system, comprising an objective lens for converging a light beam for recording or reproducing information to a recording medium composed of a vertically magnetized thin film having magnetooptic characteristics; and driving means for electromagnetically moving the objective lens in the direction of an optical axis thereof or in a direction perpendicular to the optical axis; the driving means having at least two magnetic circuits composed of yokes and permanent magnets and coils passing through magnetic clearances of the magnetic circuits, the number of magnetic circuits being an even number; the magnetic circuits being approximately arranged symmetrically with respect to a plane including the optical axis of the objective lens; and magnetizing directions of the permanent magnets constituting the magnetic circuits being asymmetrically set with respect to the plane including the optical axis of the objective lens.

The above object of the present invention can be also achieved by an apparatus for driving an optical system, comprising an objective lens for converging a light beam for recording or reproducing information to a concentric or spiral track disposed in a recording medium in the shape of a disk composed of a vertically magnetized thin film having magnetooptic characteristics, the objective lens being included in the optical system; a plurality of stationary magnetic circuits composed of permanent magnets, yokes and clearances, the permanent magnets, the yokes and the clearances extending in parallel with a radial direction of the recording medium in the shape of a disk; and a coil fixed to the optical system such that at least one portion of the coil crosses magnetic fluxes within the clearances; the plurality of magnetic circuits being constructed such that cross-sectional shapes of the magnetic circuits perpendicular to the radial direction of the recording medium are set to be approximately symmetrical with respect to a plane including the optical axis of the objective lens and parallel to the radial direction; and magnetizing directions of the permanent magnets being set asymmetrically with respect to the plane.

In accordance with the above-mentioned structure, vertical components of leakage magnetic fluxes in a recording portion of the recording medium and a peripheral portion thereof are canceled so that a sum of these vertical components is zero.

Accordingly, no recording, erasing and reproducing operations of information are adversely affected by the leakage magnetic fluxes without adding a new magnetic shielding member causing an increase in weight of the optical system driving apparatus.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an apparatus for driving an optical system in the present invention will next be described in detail with reference to the accompanying drawings.

A summary of an optical pickup device including an apparatus for driving an optical system will first be described with reference to FIG. 3.

Figure 3:
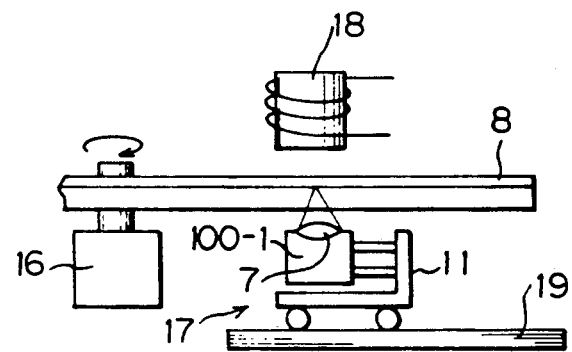
FIG. 3 is a view showing the entire construction of an optical pickup in an operating state thereof.

In FIG. 3, a recording medium 8 in the shape of a disk is composed of a vertically magnetized thin film having magnetooptic characteristics. The recording medium 8 has a concentric or spiral recording track and is rotated by a spindle motor 16.

A pickup body 17 is located on a rear side of the recording medium 8 and has an apparatus 100-1 for driving an optical system in one embodiment of the present invention. Driving force is applied to the pickup body 17 along a guide member 19 in a radial direction of the recording medium 8 so that the pickup body 17 is moved. The pickup body 17 is moved to follow the spiral recording track or access the recording track in an arbitrary radial position of the recording medium.

When information is recorded and reproduced, a light beam is irradiated from an objective lens 7 onto the recording medium 8 while a vertical magnetic field is applied to the recording medium 8 by a magnetic field applying means 18. Thus, the information is recorded and erased and this information is reproduced by detecting light reflected from the recording medium.

Figure 1:
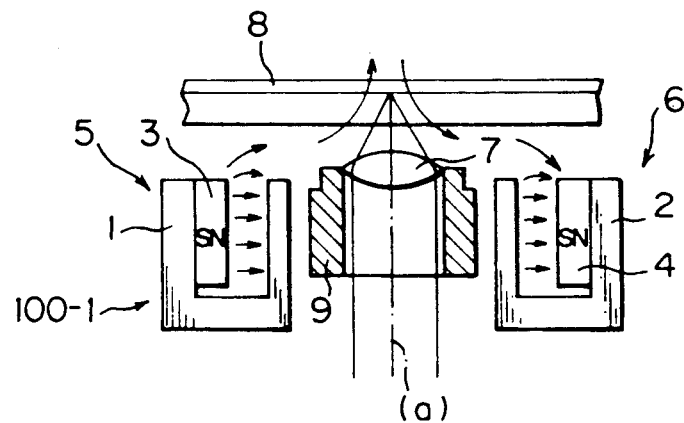
FIG. 1 is a cross-sectional view typically showing a driving mechanism for moving an objective lens.
Figure 2:
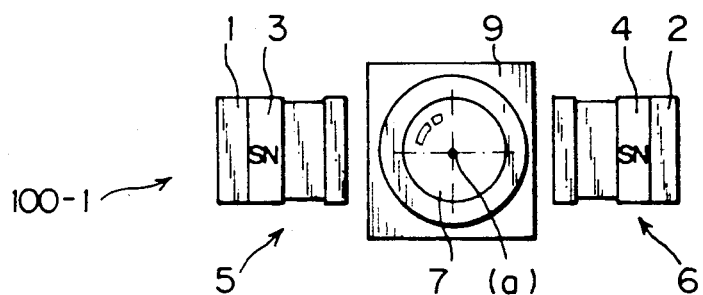
FIG. 2 is a plan view showing a main portion of the driving mechanism in FIG. 1.
Figure 4:
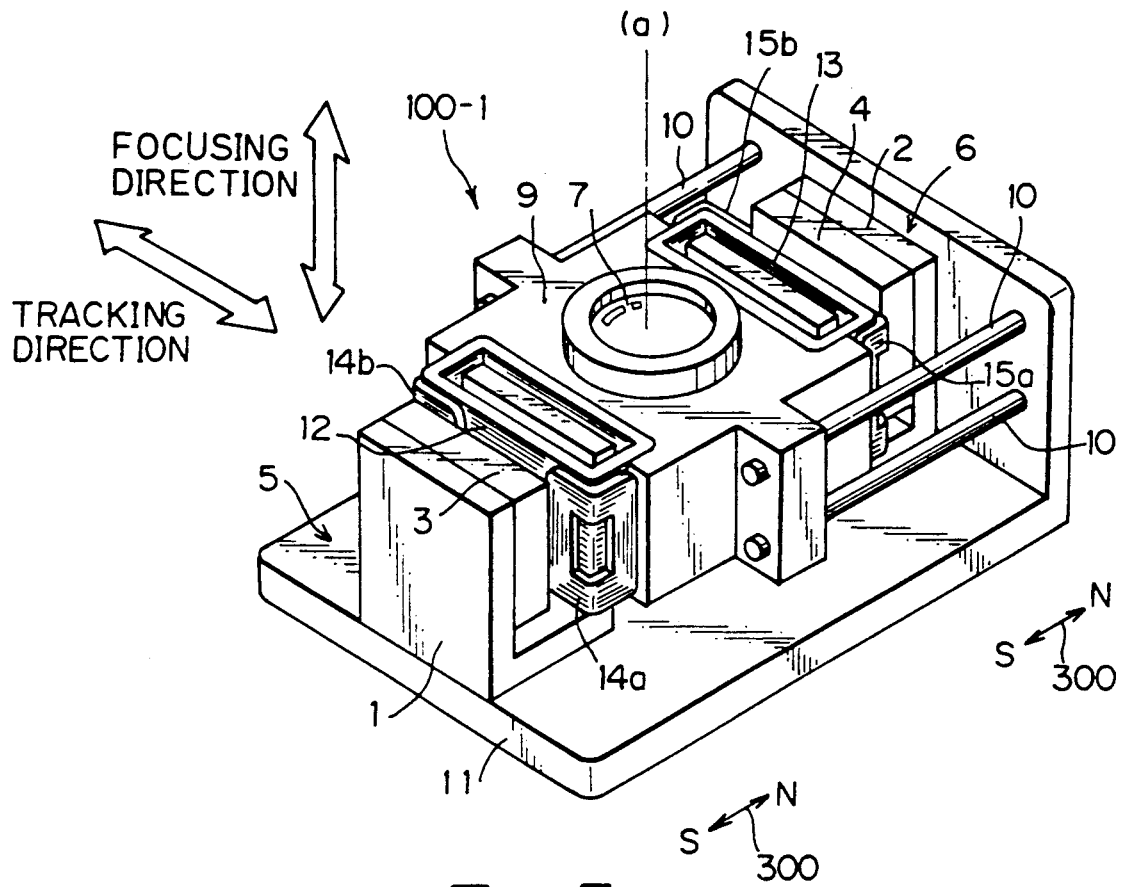
FIG. 4 is a perspective view showing an apparatus for driving an optical system in one embodiment of the present invention.

Embodiment 1 (see FIGS. 1, 2 and 4)

The operation of the optical system driving apparatus 100-1 in the present invention will next be described with reference to FIGS. 1 and 2. In these figures, the objective lens 7 is attached to an objective lens holder 9. Magnetic circuits 5 and 6 are disposed to move this objective lens 7 together with the objective lens holder 9 in the direction of an optical axis (a) of the objective lens or in a direction perpendicular thereto. The magnetic circuits 5 and 6 are symmetrically arranged with respect to the optical axis (a). The magnetic circuits 5, 6 are respectively constructed by yokes 1, 2 and permanent magnets 3, 4 magnetized in a direction perpendicular to the optical axis (a).

Concretely, the magnetizing directions of the permanent magnets 3 and 4 are asymmetrically set with respect to the optical axis (a). Therefore, the directions of respective leakage magnetic fluxes are symmetrically set with respect to the optical axis (a), but orientations thereof are opposite to each other. Accordingly, the magnitudes of vertical components of the leakage magnetic fluxes on the optical axis (a) are equal to each other and the orientations of the vertical components are opposite to each other so that these vertical components are canceled and a sum of the vertical components is zero.

Thus, a sum of the vertical components of the leakage magnetic fluxes is approximately zero in the vicinity of a light spot converged on the recording medium 8 composed of a vertically magnetized thin film having magnetooptic characteristics. Therefore, no recording, erasing and reproducing operations of information are adversely affected by the leakage magnetic fluxes.

The operation of the optical system driving apparatus 100-1 shown in FIGS. 1 and 2 will be described concretely with reference to FIG. 4.

In FIG. 4, the objective lens holder 9 is supported in the shape of a cantilever by an elastic member 10 such that this holder 9 can be moved in focusing and tracking directions. The focusing direction is a direction of the optical axis (a) of the objective lens 7 and the tracking direction is a direction perpendicular to the optical axis (a).

The yokes 1 and 2 are symmetrically arranged with respect to the optical axis (a) and is fixed to a base member 11. The magnetic circuit 5 is formed by the yoke 1 and the permanent magnet 3. The magnetic circuit 6 is formed by the yoke 2 and the permanent magnet 4. The magnetic circuits 5 and 6 are symmetrically arranged with respect to the optical axis (a). In FIG. 4, the magnetizing directions of the permanent magnets 3 and 4 are respectively designated by reference numeral 300.

The objective lens holder 9 is moved in the focusing direction by an electromagnetic action between magnetic fluxes within clearances of the magnetic circuits 5 and 6 and electric currents flowing through focusing coils 12 and 13 fixed to the objective lens holder 9. The objective lens holder 9 is moved in the tracking direction by an electromagnetic action between magnetic fluxes within the clearances of the magnetic circuits 5 and 6 and electric currents flowing through tracking coils 14a, 14b, 15a and 15b.

Figure 5:
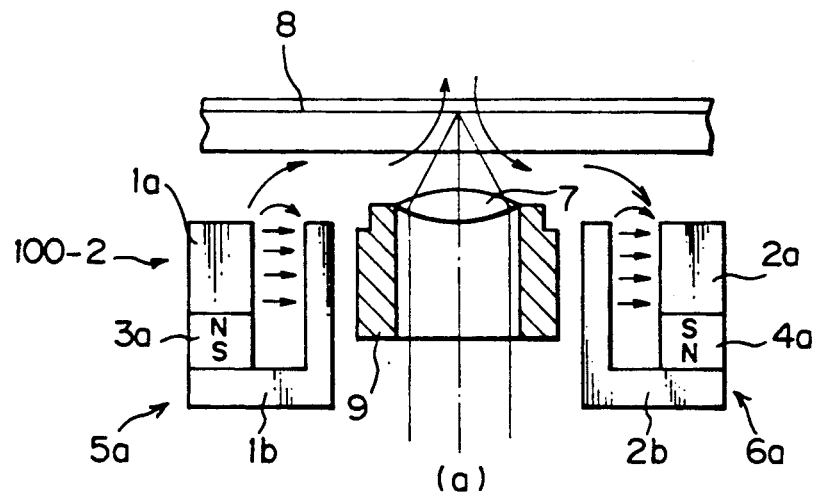
FIG. 5 is a cross-sectional view typically showing a driving mechanism for moving an objective lens.

Embodiment 2 (see FIG. 5)

As shown in FIG. 5, an apparatus 100-2 for driving an optical system in this embodiment has yokes 1a, 1b and 2a, 2b opposite to each other and magnetic circuits 5a, 6a respectively composed of permanent magnets 3a, 4a magnetized in the direction of an optical axis (a). These magnetic circuits 5a and 6a are symmetrically arranged with respect to the optical axis (a). The magnetizing directions of the permanent magnets 3a and 4a are antisymmetrically set with respect to the optical axis (a). Accordingly, similar to the above Embodiment 1, it is possible to set a sum of vertical components of leakage magnetic fluxes to approximately zero in the vicinity of a light spot converged onto a recording medium 8. Therefore, it is possible to record, erase and reproduce information without any problem.

Figure 6:
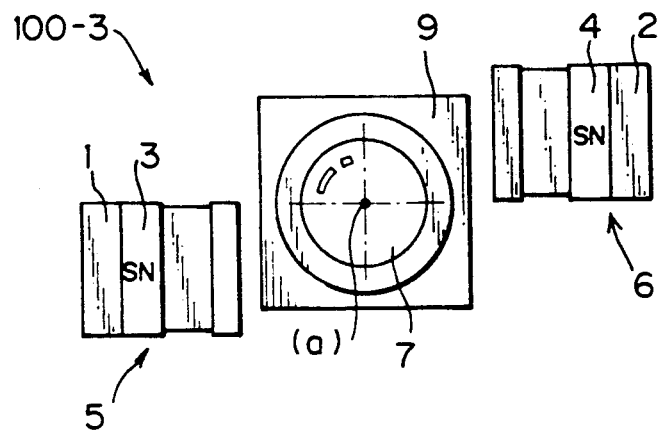
FIGS. 6 and 7 are plan views each showing a main portion of the optical system driving apparatus.

Embodiment 3 (see FIG. 6)

As shown in FIG. 6, an apparatus 100-3 for driving an optical system in this embodiment has magnetic circuits 5 and 6 having the same construction as that in the Embodiment 1. The magnetic circuits 5 and 6 are symmetrically arranged with respect to an optical axis (a) and are shifted in directions opposite to each other.

In this case, magnetizing directions of the permanent magnets 3 and 4 are asymmetrically set with respect to the optical axis (a). Therefore, similar to the Embodiments 1 and 2, it is possible to set a sum of vertical components of leakage magnetic fluxes to approximately zero in the vicinity of a light spot on the optical axis (a).

Figure 7:
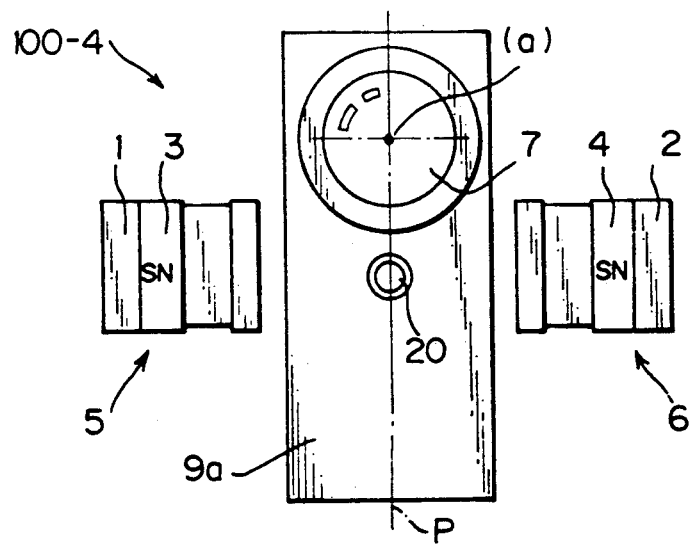
Figure 8:
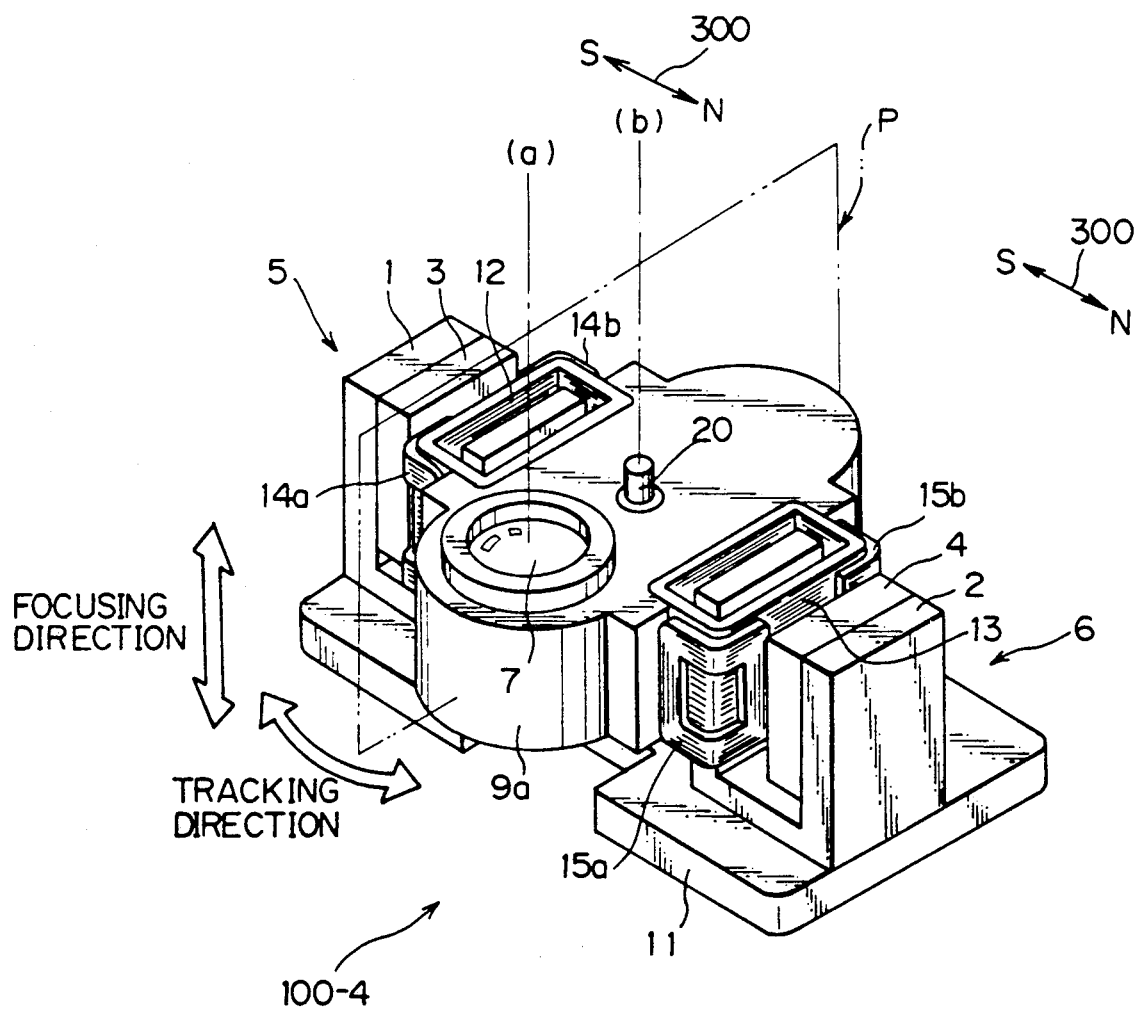
FIG. 8 is a perspective view showing an apparatus for driving an optical system in another embodiment of the present invention.

Embodiment 4 (see FIGS. 7 and 8)

FIG. 7 shows the features of an apparatus 100-4 for driving an optical system in this embodiment. The optical system driving apparatus 100-4 has magnetic circuits 5 and 6 having the same construction as that in the Embodiment 1 and shifted from each other in the same direction.

The magnetic circuits 5 and 6 are symmetrically arranged with respect to a plane P passing through an optical axis (a).

In accordance with such a structure, flows of leakage magnetic fluxes are symmetrically set with respect to the plane P. Further, only orientations of the leakage magnetic fluxes from the magnetic circuits 5 and 6 are opposite to each other by an asymmetrically setting the magnetizing directions of permanent magnets 3 and 4 with respect to the plane P as shown in FIG. 7. Therefore, the magnitudes of vertical components of the leakage magnetic fluxes on the plane P are equal to each other and the orientations of these vertical components are opposite to each other so that the vertical components are canceled and a sum thereof is zero. Accordingly, a sum of vertical components of the leakage magnetic fluxes is approximately zero in the vicinity of a light spot on the optical axis (a) included on the plane P so that no recording, erasing and reproducing operations of information are adversely influenced by the leakage magnetic fluxes.

The construction of the optical system driving apparatus 100-4 in FIG. 7 will next be described concretely with reference to FIG. 8.

In FIG. 8, and objective lens holder 9a for holding an objective lens 7 is slidably held by a base member 11 together with a shaft 20 fixed to this base member 11. The objective lens 7 and the objective lens holder 9a can be moved by driving force of the magnetic circuits 5 and 6 in focusing and tracking directions. The focusing direction is a direction of a central axis (b) of this shaft 20. The tracking direction is a direction in which the objective lens and the objective lens holder are rotated around the central axis (b). Focusing coils 12, 13, tracking coils 14a, 14b, 15a and 15b and magnetizing directions 300 are similar to those in FIG. 4.

Yokes 1 and 2 are fixed to the base member 11 and are symmetrically arranged with respect to the plane P including the optical axis (a) of the objective lens 7 in a neutral position thereof in the tracking direction and the central axis (b) of the shaft 20. The magnetic circuit 5 is formed by the yoke 1 and the permanent magnet 3. The magnetic circuit 6 is formed by the yoke 2 and the permanent magnet 4. The magnetic circuits 5 and 6 are symmetrically arranged with respect to the plane P. As mentioned above, the magnetizing directions of the permanent magnets 3 and 4 are asymmetrically set with respect to the plane P. Accordingly, a sum of vertical components of leakage magnetic fluxes on the plane P from the magnetic circuits 5 and 6 is zero. A sum of vertical components of the leakage magnetic fluxes is also approximately zero in the vicinity of a light spot converted onto a recording track. Accordingly, no recording, erasing and reproducing operations of information are adversely affected by the leakage magnetic fluxes. Similar to the case shown in FIG. 3, the base member 11 is moved along a guide member 19. As mentioned above, in the Embodiments 1 to 4, a sum of the vertical components of leakage magnetic fluxes from the magnetic circuits is approximately zero in the vicinity of a light spot so that no recording, erasing and reproducing operations of information are adversely affected by the leakage magnetic fluxes.

In the next embodiment, an apparatus for driving an optical system has a plurality of stationary magnetic circuits and coils fixed to the above-mentioned optical system. Each of the magnetic circuits is composed of a permanent magnet, a yoke and a clearance. The permanent magnet, the yoke and the clearance extend in parallel with the radial direction of a recording medium in the shape of a disk. At least one portion of each of the coils crosses a magnetic flux within the above clearance.

Figure 9:
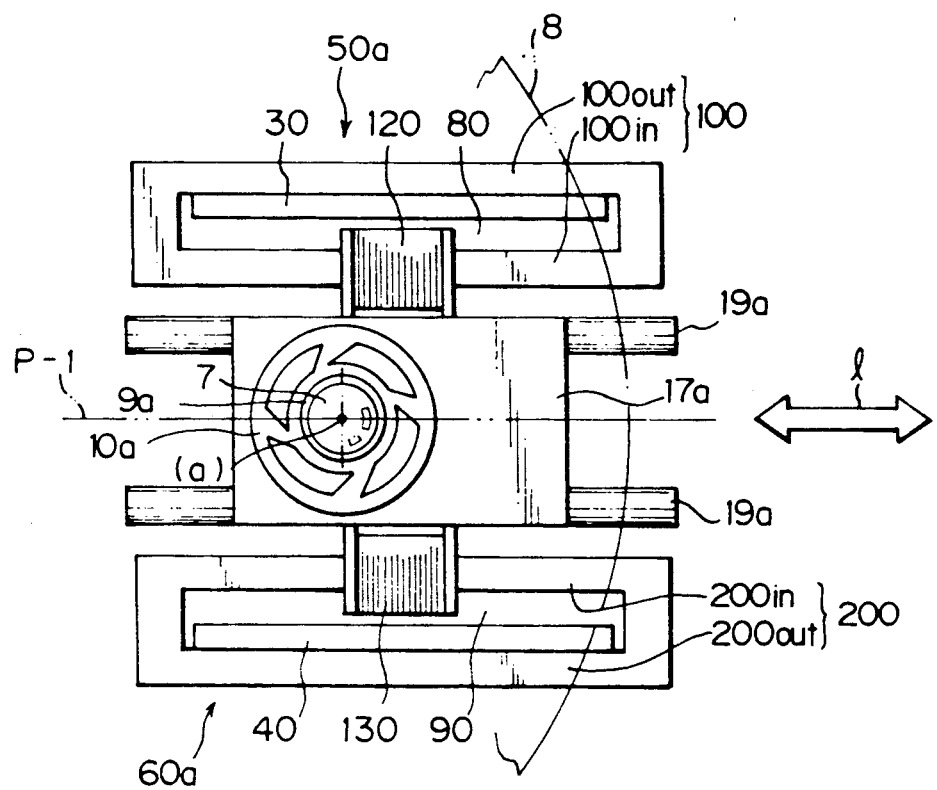
FIG. 9 is a plan view showing a main portion of the optical system driving apparatus.
Figure 10:
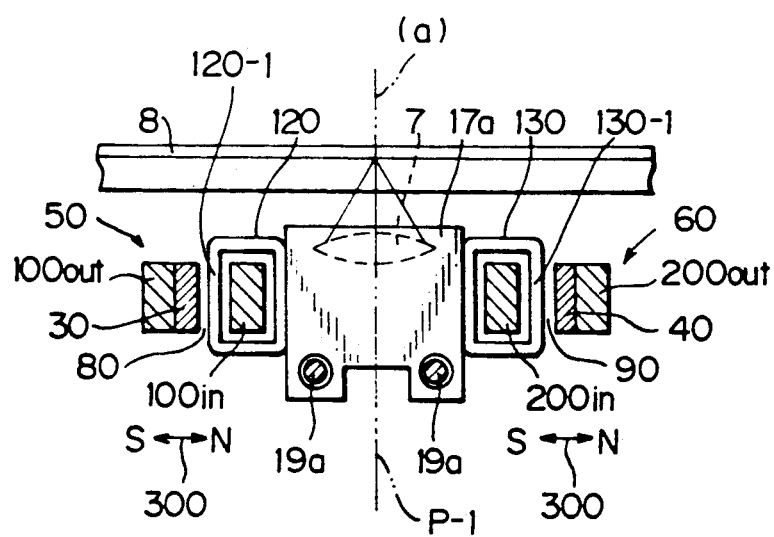
FIG. 10 is a cross-sectional view of the optical system driving apparatus shown in FIG. 9.
Figure 11:
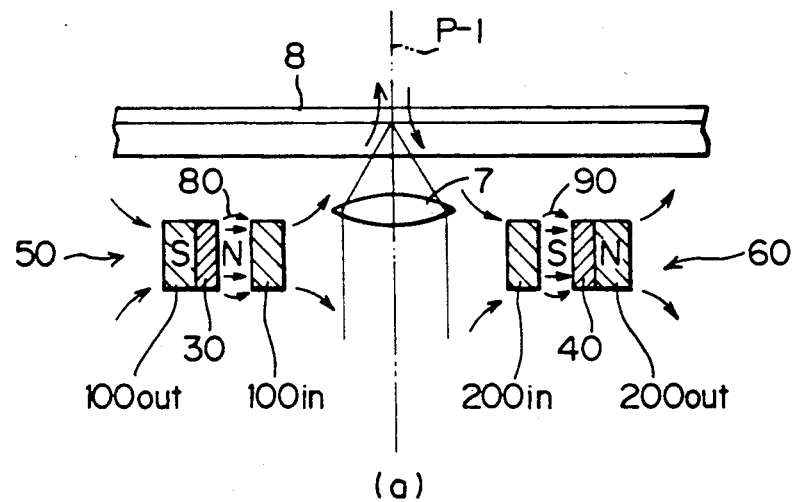
FIG. 11 is a cross-sectional view typically showing a driving mechanism for moving an objective lens.

EMBODIMENT 5 (see FIGS. 9 to 11)

In FIG. 9, a pickup body 17a can be moved along guide members 19a in a radial direction l of a recording medium 8. An objective lens 7 is fixed to an objective lens holder 9a and this holder 9a is movably supported by the pickup body 17a through an elastic member 10a in the directioin of an optical axis (a) of the objective lens.

The objective lens holder 9a is moved by an unillustrated focusing mechanism in the direction of the optical axis (a) to perform focusing control. Tracking control is performed by a tracking mechanism such as an unillustrated galvanomirror, etc. Thus, a light beam is converged as a light spot onto a track of the recording medium 8.

Magnetic circuits 50a, 60a are respectively composed of permanent magnets 30, 40, yokes 100, 200 and clearance 80, 90. The permanent magnets 30, 40, the yokes 100, 200 and the clearances 80, 90 extend in parallel with the radial direction l.

Coils 120 and 130 are fixed to the pickup body 17a such that these coils cross magnetic fluxes within the clearances 80 and 90. Thus, the pickup body 17a is moved in the radial direction l by an electromagnetic action between electric currents flowing through the coils 120 and 130 and the magnetic fluxes within the clearances 80 and 90.

FIG. 10 shows a cross-sectional portion of the optical system driving apparatus in a direction perpendicular to the radial direction l. In FIG. 10, reference numeral P-1 designates a plane including the optical axis (a) in the radial direction of the recording medium 8 and parallel to a direction perpendicular to a paper face.

The magnetic circuits 50, 60 are respectively constructed such that inside yokes $100_{in}$, $200_{in}$, outside yokes $100_{out}$, $200_{out}$ and the permanent magnets 30, 40 are symmetrically arranged with respect to the plane P-1.

Respective magnetizing directions 300 of the permanent magnets 30 and 40 are asymmetrically set with respect to the plane P-1 Accordingly, the magnetic fluxes within the clearances 80 and 90 are directed from left to right.

An electric current flows through portions 120-1, 130-1 of the coils 120, 130 within the clearances from above to below in FIG. 10. Thus, the pickup body 17a is moved from the rear side of a paper face onto the front side thereof in a direction perpendicular to the paper face.

The situations of leakage magnetic fluxes will next be described with reference to FIG. 11 typically showing the optical system driving apparatus in cross section in a direction perpendicular to the radial direction l. In FIG. 11, magnetic circuits 50 and 60 have cross-sectional shapes symmetrical with respect to the plane P-1. Therefore, flows of the leakage magnetic fluxes are symmetrical with respect to the plane P-1. As already mentioned above, the magnetizing directions of the permanent magnets 30 and 40 are asymmetrically set with respect to the plane P-1. Accordingly, the magnitudes of vertical components of the leakage magnetic fluxes on the plane P-1 are equal to each other and the orientations of the vertical components are opposite to each other so that these vertical components are canceled. A sum of the vertical components of the leakage magnetic fluxes is approximately zero in the vicinity of a convergent point of a light beam, i.e., a light spot for recording, erasing and reproducing information. Accordingly, no recording, erasing and reproducing operations of information are adversely affected by the leakage magnetic fluxes.

Figure 12:
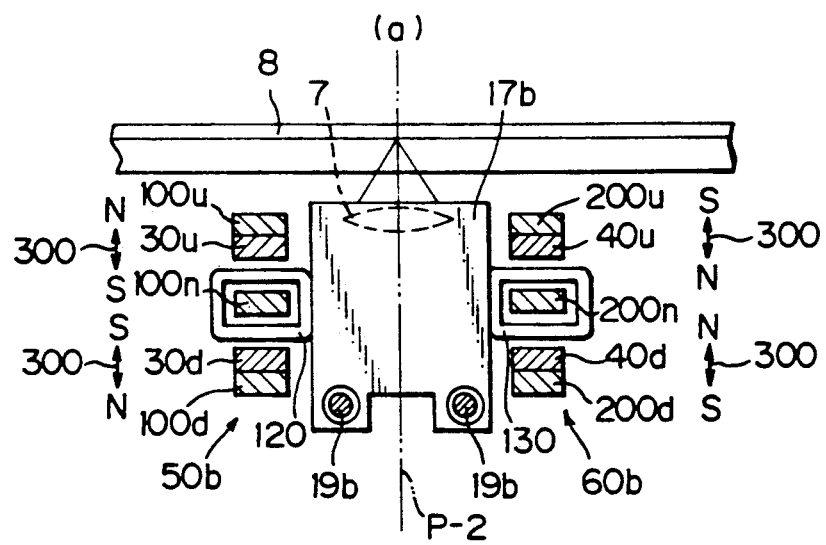
FIG. 12 is a cross-sectional view of the optical system driving apparatus.
Figure 13:
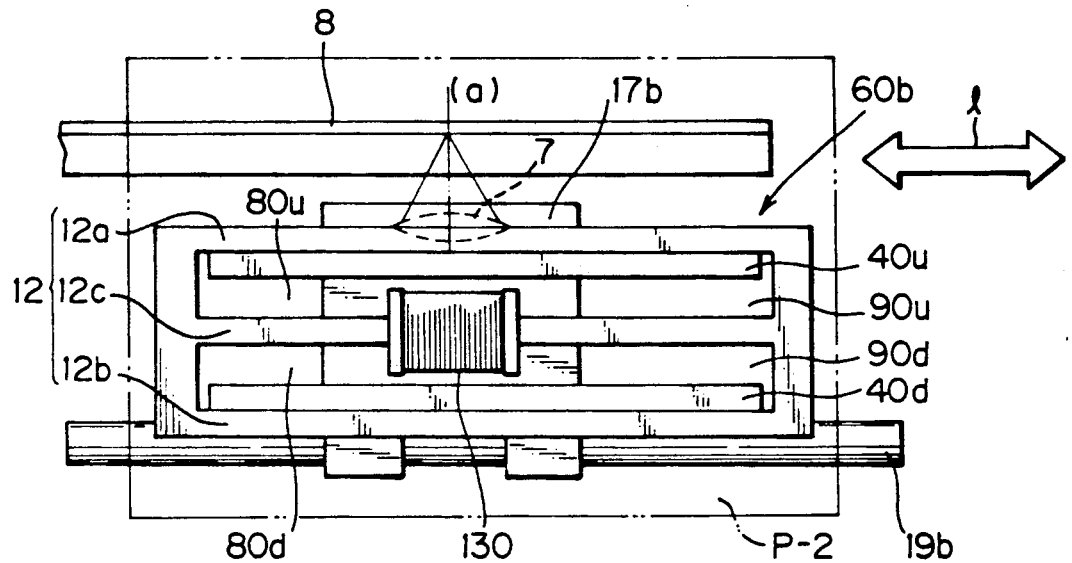
FIG. 13 is a front view of the optical system driving apparatus.
Figure 14:
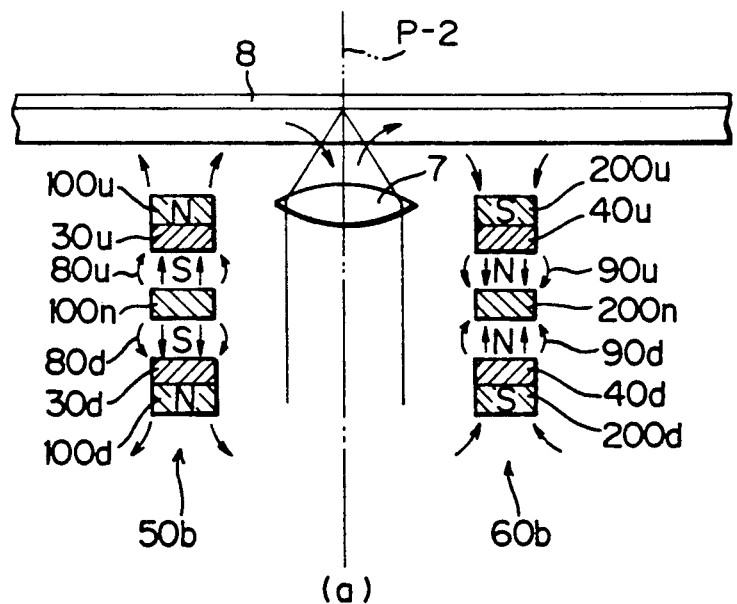
FIG. 14 is a cross-sectional view typically showing a driving mechanism for moving an objective lens.

EMBODIMENT 6 (see FIGS. 12 to 14)

This embodiment corresponds to a case in which the yokes in the Embodiment 5 are rotated 90°.

As shown in FIG. 13, a pickup body 17b including an objective lens 7 can be moved along a guide member 19b in a radial direction l of a recording medium 8.

Magnetic circuits 50b, 60b are respectively composed of upper yokes 100u, 200u upper permanent magnets 30u, 40u fixed to the upper yokes, lower yokes 100d, 200d, lower permanent magnets 30d, 40d fixed to the lower yokes, and intermediate yokes 100n, 200n. The magnetic circuits are symmetrically arranged with respect to a plane P-2 including an optical axis (a) of the objective lens 7 and parallel to the radial direction l.

Magnetizing directions 300 of the upper permanent magnets 30u and 40u are asymmetrically set with respect to the plane P-2 and magnetizing directions 300 of the lower permanent magnets 30d and 40d are asymmetrically set with respect to the plane P-2. S-poles of the magnets 30u and 30d are set opposite to each other and N-poles of the magnets 40u and 40d are set opposite to each other.

Accordingly, magnetic fluxes are directed upward in clearances 80u and 90d and are directed downward in clearances 80d and 90u. In FIG. 12, the pickup body 17b is moved from the rear side of a paper face to the front side thereof in a direction perpendicular to the paper face by flowing an electric current through a coil 120 in the clockwise direction and flowing an electric current through a coil 130 in the counterclockwise direction.

FIG. 14 shows situations of the leakage magnetic fluxes in cross section in a direction perpendicular to the radial direction l. As can be seen from FIG. 14, in this embodiment, similar to the above Embodiment 5 shown in FIG. 11, a sum of vertical components of the leakage magnetic fluxes is approximately zero in the vicinity of a convergent point of a light beam. Accordingly, no recording, erasing and reproducing operations of information are adversely affected by the leakage magnetic fluxes.

Figure 15:
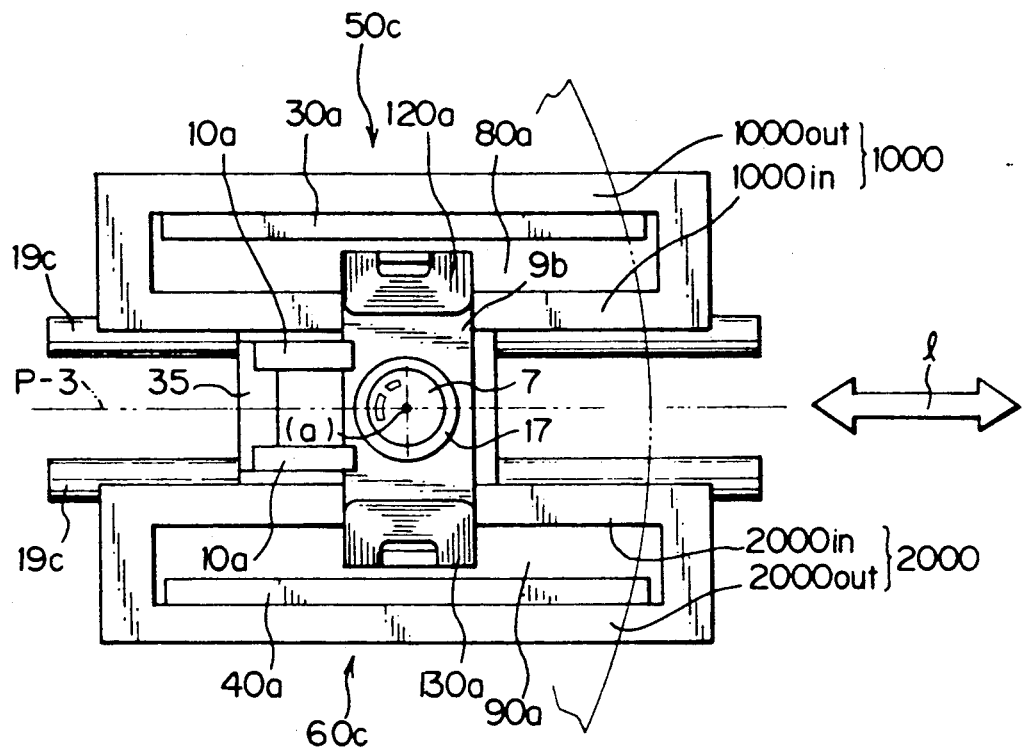
FIG. 15 is a plan view showing a main portion of the optical system driving apparatus.
Figure 16:
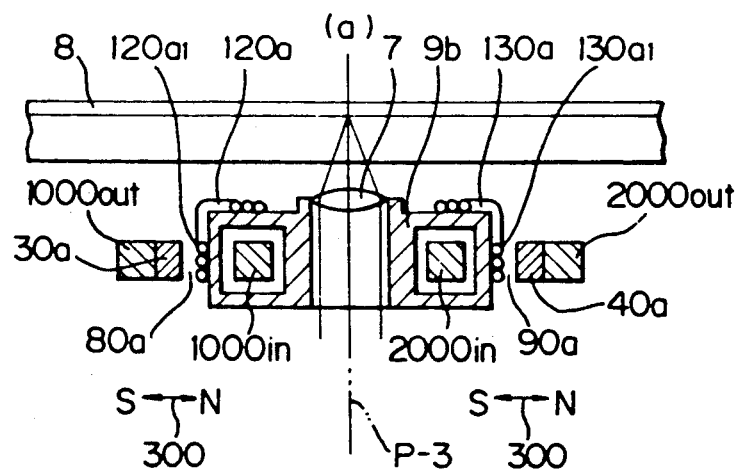
FIG. 16 is a cross-sectional view of the optical system driving apparatus shown in FIG. 15.

EMBODIMENT 7 (see FIGS. 15 and 16)

In this embodiment, vertical components of leakage magnetic fluxes from magnetic circuits for moving an objective lens in the direction of an optical axis thereof are set to be canceled.

In FIG. 15, an objective lens 7 is fixed to an objective lens holder 9b and this holder 9b is movably supported by a carriage 35 in the direction of an optical axis (a) of the objective lens 7 though an elastic member 10a.

The carriage 35 can be moved along a guide member 19c in a radial direction l of a recording medium 8 and is moved by an unillustrated driving mechanism in the radial direction l.

Magnetic circuits 50c, 60c are respectively composed of permanent magnets 30a, 40a, yokes 1000, 2000 and clearances 80a, 90a. The permanent magnets 30a, 40a, the yokes 1000, 2000 and the clearances 80a, 90a extend in parallel with the radial direction 1.

Coils 120a and 130a respectively cross clearances 80a and 90a and are fixed to the objective lens holder 9b. The objective lens holder 9b is moved in the direction of the optical axis (a) of the objective lens 7 by an electromagnetic action between electric currents flowing through the coils 120a and 130a and magnetic fluxes within the clearances 80a and 90a, thereby performing focusing control. Tracking control is performed by an unillustrated tracking mechanism such as a galvanomirror, etc.

As illustrated in FIG. 16 showing an optical system driving apparatus in cross section in a direction perpendicular to the radial direction 1, reference numeral P-3 designates a plane including the optical axis (a) and parallel to the radial direction 1.

The magnetic circuits 50c, 60c are respectively constructed by inside yokes $1000_{in}$, $2000_{in}$, outside yokes $1000_{out}$, $2000_{out}$, and permanent magnets 30a, 40a. The permanent magnets 30a and 40a and fixed to the outside yokes $1000_{out}$ and $2000_{out}$ and are symmetrically arranged with respect to the plane P-3. Magnetizing directions of the permanent magnets 30a and 40a are asymmetrically set with respect to the plane P-3. Magnetic fluxes within the clearances 80a and 90a are directed from left to right in FIG. 16. The objective lens holder 9b is moved upward by flowing an electric current through portions $120a_1$ and $130a_1$ of the coils 120a and 130a within the clearances from the rear side of a paper face in FIG. 16 to the front side thereof.

In this embodiment, similar to the embodiment shown in FIG. 11, leakage magnetic fluxes are generated from the magnetic circuits 50c and 60c. Accordingly, a sum of vertical components of the leakage magnetic fluxes is approximately zero in the vicinity of a convergent point of a light beam. Therefore, no recording, erasing and reproducing operations of information are adversely affected by the leakage magnetic fluxes.

As mentioned above, in the Embodiments 5 to 7, an apparatus for driving an optical system has an objective lens for converging a light beam for recording, erasing and reproducing information to a recording medium. A plurality of magnetic circuits are also disposed in the optical system driving apparatus and are symmetrically arranged with respect to a plane including an optical axis of the objective lens and parallel to a radial direction of the recording medium. The radial direction of the recording medium is a direction in which the objective lens is moved. Magnetizing directions of permanent magnets constituing these magnetic circuits are asymmetrically set with respect to the above plane. Accordingly, a sum of vertical components of leakage magnetic fluxes from the magnetic circuits is approximately zero in the vicinity of a convergent point of a light beam. Therefore, no recording erasing and reproducing operations of information are adversely affected by the leakage magnetic fluxes.

In each of the Embodiments 1 to 7, it is not necessary to additionally dispose a magnetic shielding member for reducing leakage magnetic fluxes from the optical system driving apparatus, a correcting magnet, etc. in a pickup body. Accordingly, an access operation can be rapidly performed with respect to a recording track in an arbitrary radial position of the recording medium without increasing the weight of the optical pickup body. Further, there is no fear of contact between the recording medium 8 and the magnetic shielding member since it is not necessary to dispose the magnetic shielding member in a small clearance between the recording medium 8 and the pickup body 17.

As mentioned above, in accordance with the present invention, conventional members are reconstructed without adding a new magnetic shielding member causing an increase in weight of the optical system driving apparatus. Thus, no recording, erasing and reproducing operations of information are adversely affected by leakage magnetic fluxes.

Many widely different embodiments of the present invention may be constructed without departing from the spirit and scope of the present invention. It should be understood that the present invention is not limited to the specific enbodiments described in the specification, except as defined in the appended claims.

What is claimed is:

1. An apparatus for driving an optical system, comprising:
    an objective lens for converging a light beam for recording or reproducing information to a recording medium composed of a vertical magnetized thin film having magnetooptic characteristics;
    a base member adapted to be moved in a radial direction of the recording medium;
    at least one pair of magnetic circuits disposed on the base member approximately symmetrically with respect to an optical axis of the objective lens, the magnetic circuits comprising yokes fixed to the base member and permanent magnets fixed to the yokes, a magnetizing direction of the permanent magnets being asymmetrically set with respect to the optical axis; and
    coils passing through magnetic clearances of the magnetic circuits,
    the objective lens adapted to be moved electromagnetically by the magnetic circuits and the coils in a direction of the optical axis or in a direction perpendicular to the optical axis with respect to the base member.

2. A driving apparatus as claimed in claim 1, wherein vertical components of leakage magnetic fluxes in a recording portion and a peripheral portion of the recording medium are canceled so that a sum of the vertical components is zero.

3. A driving apparatus as claimed in claim 1, wherein vertical components of leakage magnetic fluxes from the magnetic circuits are canceled in the vicinity of a convergent point of the light beam so that a sum of the vertical components is approximately zero.

4. An apparatus for driving an optical system, comprising:
    an objective lens for converging a light beam for recording or reproducing information to a recording medium composed of a vertically magnetized thin film having magnetooptic characteristics;
    a base member adapted to be moved in a radial direction of the recording medium;
    at least one pair of magnetic circuits dispoed on the base member approximately symmetrically with respect to a plane including an optical axis of the objective lens, the magnetic circuits comprising yokes fixed to the base member and permanent magnets fixed to the yokes, a magnetizing direction of the permanent magnets being asymmetrically set with respect to the plane; and
    coils passing through magnetic clearances of the magnetic circuits, the objective lens adapted to be moved electromagnetically by the magnetic circuits and the coils in a direction of the optical axis or in a direction perpendicular to the optical axis with respect to the base member.

5. A driving apparatus as claimed in claim 4, wherein vertical components of leakage magnetic fluxes in a recording portion and a peripheral portion of the recording medium are canceled so that a sum of the vertical components is zero.

6. A driving apparatus as claimed in claim 4, wherein vertical components of leakage magnetic fluxes from the magnetic circuits are canceled in the vicinity of a convergent point of the light beam so that a sum of the vertical components is approximately zero.

7. An apparatus for driving an optical system, comprising:

an objective lens for converging a light beam for recording or reproducing information to a concentric or spiral track disposed in a recording medium in the shape of a disk composed of a vertically magnetized thin film having magnetooptic characteristics, the objective lens being included in the optical system;

a plurality of stationary magnetic circuits comprising yokes, permanent magnets fixed to each yoke respectively and clearances, the yokes, the permanent magnets and the clearances extendig in parallel with a radial direction of the recording medium in the shape of a disk; and &1 a coil fixed to the optical system such athat at least one portion of the coil crosses magnetic fluxes within the clearances; the plurality of magnetic circuits being constructed such that cross-sectional shapes of the magnetic circuits perpendicular to the radial direction of the recording medium are set to be approximately symmetrical with respect to a plane including the optical axis of the objective lens and parallel to the radial direction and the magnetizing direction of the permanent magnets being set to be asymmetrical with respect to the plane.

8. A driving apparatus as claimed in claim 7 wherein vertical components of leakage magnetic fluxes in a recording portion and a peripheral portion of the recording medium are canceled so that a sum of the vertical components is zero.

9. A driving apparatus as claimed in claim 7, wherein vertical components of leakage magnetic fluxes from the magnetic circuits are canceled in the vicinity of a convergent point of the light beam so that a sum of the vertical components is approximately zero.

* * * * *